United States Patent [19]
Bricker et al.

[11] Patent Number: 4,897,180
[45] Date of Patent: Jan. 30, 1990

[54] CATALYTIC COMPOSITE AND PROCESS FOR MERCAPTAN SWEETENING

[75] Inventors: Jeffery C. Bricker, Buffalo Grove; Robert R. Frame, Glenview, both of Ill.

[73] Assignee: UOP, Des Plaines, Ill.

[21] Appl. No.: 303,197

[22] Filed: Jan. 30, 1989

Related U.S. Application Data

[63] Continuation-in-part of Ser. No. 152,508, Feb. 5, 1988, Pat. No. 4,824,818.

[51] Int. Cl.$^4$ .............................................. C10G 27/00
[52] U.S. Cl. ................................... 208/189; 208/203; 208/204; 208/206; 208/208 R; 502/163
[58] Field of Search ............... 208/189, 203, 204, 206, 208/208 R; 502/163

[56] References Cited

U.S. PATENT DOCUMENTS

| | | | |
|---|---|---|---|
| 2,918,426 | 12/1959 | Quiquerez et al. | 208/206 |
| 2,966,453 | 12/1960 | Gleim et al. | 208/206 |
| 2,988,500 | 6/1961 | Gleim et al. | 208/206 |
| 3,108,081 | 10/1963 | Gleim et al. | 252/428 |
| 3,252,892 | 5/1966 | Gleim et al. | 208/206 |
| 4,013,700 | 3/1977 | Cauese | 502/161 |
| 4,033,860 | 7/1977 | Carlson | 208/206 |
| 4,156,641 | 5/1979 | Frame | 208/207 |
| 4,157,312 | 6/1979 | Frame | 502/164 |
| 4,206,079 | 6/1980 | Frame | 502/164 |
| 4,273,668 | 6/1981 | Crivello | 502/168 |
| 4,290,913 | 9/1981 | Frame | 252/428 |
| 4,293,442 | 10/1981 | Frame | 502/164 |
| 4,337,147 | 7/1982 | Frame | 208/206 |
| 4,522,932 | 6/1985 | Mitchell, II | 502/162 |

OTHER PUBLICATIONS

"Nomenclature of Organic Compounds," Advances in Chemistry Series 126, J. H. Fletcher, O. C. Dermer and R. B. Fox, Editors, Amer. Chem. Soc. Publishers, pp. 189–190, Jan. 1974.

*Primary Examiner*—Helane Myers
*Attorney, Agent, or Firm*—Thomas K. McBride; Eugene I. Snyder; Frank S. Molinaro

[57] ABSTRACT

This invention relates to a catalytic composite effective in oxidizing mercaptans contained in a sour petroleum distillate to disulfides. The catalytic composite comprises a metal chelate, an onium compound and optionally an alkali metal hydroxide. The onium compound may be selected from the group consisting of phosphonium, arsonium, stibonium, oxonium and sulfonium compounds, with phosphonium, oxonium and sulfonium compounds preferred. Additionally, metal phthalocyanines are a preferred class of metal chelates. This invention also relates to an improved process for treating a sour petroleum distillate, wherein the improvement comprises using the catalytic composite described above.

15 Claims, 1 Drawing Sheet

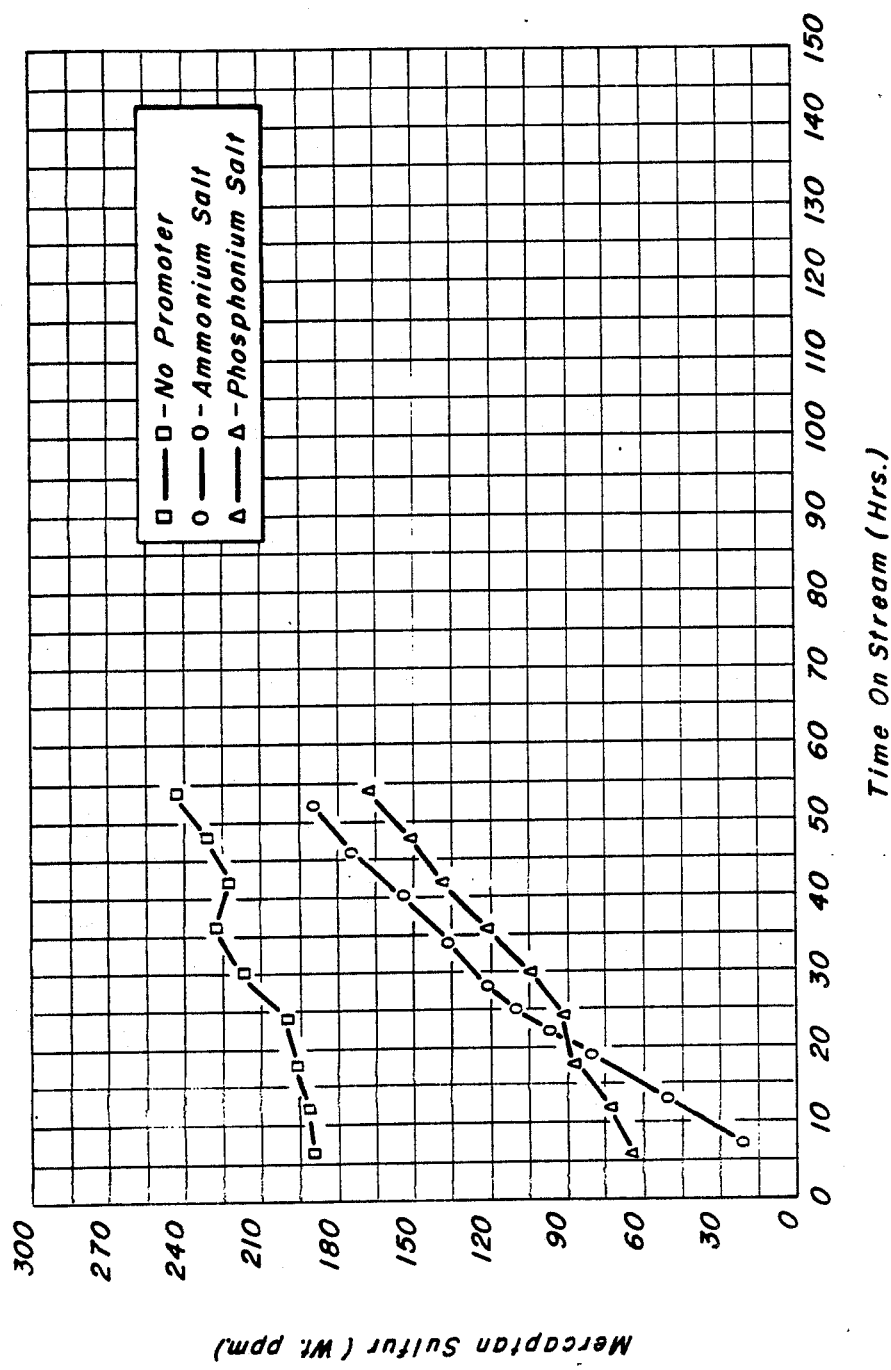

CATALYTIC COMPOSITE AND PROCESS FOR MERCAPTAN SWEETENING

CROSS REFERENCE TO RELATED APPLICATION

This application is a Continuation-in-part of prior copending application Ser. No. 152,508 filed Feb. 5, 1988 now U.S. Pat. No. 4,824,818.

BACKGROUND OF THE INVENTION

Processes for the treatment of sour petroleum distillates wherein the distillate is treated in contact with an oxidation catalyst in the presence of an oxidizing agent at alkaline reaction conditions have become well-known and widely practiced in the petroleum refining industry. Said processes are typically designed to effect the oxidation of offensive mercaptans contained in a sour petroleum distillate with the formation of innocuous disulfides-a process commonly referred to as sweetening. The oxidizing agent is most often air. Gasoline, including natural, straight run and cracked gasolines, is the most frequently treated sour petroleum distillate. Other sour petroleum distillates include the normally gaseous petroleum fraction as well as naphtha, kerosene, jet fuel, fuel oil, lube oil, and the like.

A commonly used continuous process for treating sour petroleum distillates entails contacting the distillate with a metal phthalocyanine catalyst dispersed in an aqueous caustic solution to yield a doctor sweet product. The sour distillate and the catalyst containing aqueous caustic solution provide a liquid-liquid system wherein mercaptans are converted to disulfides at the interface of the immiscible solutions in the presence of an oxidizing agent-usually air. Sour petroleum distillates containing more difficulty oxidizable mercaptans are more effectively treated in contact with a metal chelate catalyst disposed on a high surface area adsorptive support-usually a metal phthalocyanine on an activated charcoal. The distillate is treated in contact with the supported metal chelate catalyst at oxidation conditions in the presence of an alkaline agent. One such process is described in U.S. Pat. No. 2,988,500. The oxidizing agent is most often air admixed with the distillate to be treated, and the alkaline agent is most often an aqueous caustic solution charged continuously to the process or intermittently as required to maintain the catalyst in the caustic-wetted state.

The prior art shows that the usual practice of catalytically treating a sour petroleum distillate containing mercaptans involves the introduction of alkaline agents, usually sodium hydroxide, into the sour petroleum distillate prior to or during the treating operation. See U.S. Pat. Nos. 3,108,081 and 4,156,641. The prior art also discloses that quaternary ammonium compounds can improve the activity of these catalytic systems. For example, see U.S. Pat. Nos. 4,290,913 and 4,337,147. In these patents the catalytic composite comprises a metal chelate, an alkali metal hydroxide and a quaternary ammonium hydroxide disposed on an adsorptive support.

Applicants have found that onium compounds in which the cationic atom is selected from the group consisting of phosphorous, arsenic, antimony, oxygen, and sulfur are effective promoters for sweetening sour petroleum distillates. An onium compound is an ion-pair compound containing one or more organic cationic groups in which the positively charged atom is a non-metallic element other than carbon and in which the positively charged (cationic) atom is not attached to hydrogen. The most common onium compound is the quaternary ammonium compound. See "Nomenclature of Organic Compounds," Advances in Chemistry Series 126, J. H. Fletcher, O. C. Dermer and R. B. Fox, editors, Amer. Chem. Soc. publishers, page 189-90, 1974.

There is no mention in the prior art that onium compounds in which the cationic atom is, for example, phosphorous or sulfur would be effective promoters for the conversion of mercaptans to disulfides. Applicants have found, for example, that phosphonium compounds have better stability than ammonium quaternary compounds. Thus, applicants have provided an improved catalytic composite and process for sweetening a sour petroleum distillate.

SUMMARY OF THE INVENTION

It is a broad objective of this invention to present an improved catalytic composite for treating a sour petroleum distillate containing mercaptans and an improved method, using said composite, for treating a sour petroleum distillate.

One broad embodiment of the invention is a catalytic composite effective in oxidizing mercaptans contained in a sour petroleum distillate to disulfides comprising a metal chelate, an onium compound selected from the group consisting of phosphonium, arsonium, stibonium, oxonium and sulfonium compounds and optionally an alkali metal hydroxide, dispersed on an adsorptive support, the onium compound having the formula $[R'(R)_yM]^+X^-$ wherein R is a hydrocarbon radical containing up to about 20 carbon atoms and selected from the group consisting of alkyl, cycloalkyl, aryl, alkaryl and aralkyl, R' is a straight chain alkyl radical containing from about 5 to about 20 carbon atoms, M is phosphorous, arsenic, antimony, oxygen, or sulfur, X is hydroxide or a halide selected from the group consisting of chlorine, bromine and iodine, y is 2 when M is oxygen or sulfur and y is 3 when M is phosphorous, arsenic or antimony.

Another broad embodiment of the present invention is an improved method of treating a sour petroleum distillate containing mercaptans by contacting said distillate in the presence of an oxidizing agent with a catalytic composite, wherein the improvement comprises the use of the catalytic composite described in the preceding paragraph.

Other objects and embodiments of this invention will become apparent in the following detailed description.

BRIEF DESCRIPTION OF THE DRAWINGS

FIG. 1 shows a graph of mercaptan sulfur in the distillate versus time on stream. Results are presented for a catalytic composite without a quaternary compound, a catalytic composite with an ammonium quaternary salt, and a catalytic composite with a phosphonium compound.

DETAILED DESCRIPTION OF THE INVENTION

As described above, the catalytic composite of this invention comprises a metal chelate, an onium compound and optionally an alkali metal hydroxide, all dispersed on an adsorbent support. The adsorbent support which may be used in the practice of this invention can be any of the well known adsorbent materials generally utilized as a catalyst support or carrier material. Preferred adsorbent materials include the various charcoals produced by the destructive distillation of wood, peat, lignite, nutshells, bones, and other carbonaceous matter, and preferably such charcoals as have been heat-treated or chemically treated or both, to form a highly porous particle structure of increased adsorbent capacity, and generally defined as activated carbon or charcoal. Said adsorbent materials also include the naturally occurring clays and silicates, e.g., diatomaceous earth, fuller's earth, kieselguhr, attapulgus clay, feldspar, montorillonite, halloysite, kaolin, and the like, and also the naturally occurring or synthetically prepared refractory inorganic oxides such as alumina, silica, zirconia, thoria, boria, etc., or combinations thereof like silica-alumina, silica-zirconia, alumina-zirconia, etc. Any particular solid adsorbent material is selected with regard to its stability under conditions of its intended use. For example, in the treatment of a sour petroleum distillate, the adsorbent support should be insoluble in, and otherwise inert to, the petroleum distillate at the alkaline reaction conditions existing in the treating zone. Charcoal, and particularly activated charcoal, is preferred because of its capacity for metal chelates, and because of its stability under treating conditions.

Another necessary component of the catalytic composite of this invention is a metal chelate which is dispersed on an adsorptive support. The metal chelate employed in the practice of this invention can be any of the various metal chelates known to the art as effective in catalyzing the oxidation of mercaptans contained in a sour petroleum distillate, to disulfides or polysulfides. The metal chelates include the metal compounds of tetrapyridinoporphyrazine described in U.S. Pat. No. 3,980,582, e.g., cobalt tetrapyridinoporphyrazine; porphyrin and metaloporphyrin catalysts as described in U.S. Pat. No. 2,966,453, e.g., cobalt tetraphenylporphyrin sulfonate; corrinoid catalysts as described in U.S. Pat. No. 3,252,892, e.g., cobalt corrin sulfonate; chelate organometallic catalysts such as described in U.S. Pat. No. 2,918,426, e.g., the condensation product of an aminophenol and a metal of Group VIII; the metal phthalocyanines as described in U.S. Pat. No. 4,290,913, etc. As stated in U.S. Pat. No. 4,290,913, metal phthalocyanines are a preferred class of metal chelates.

The metal phthalocyanines which can be employed to catalyze the oxidation of mercaptans generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, platinum phthalocyanine, palladium phthalocyanine, copper phthalocyanine, silver phthalocyanine, zinc phthalocyanine, tin phthalocyanine, and the like. Cobalt phthalocyanine and vanadium phthalocyanine are particularly preferred. The ring substituted metal phthalocyanines are generally employed in preference to the unsubstituted metal phthalocyanine (see U.S. Pat. No. 4,290,913), with the sulfonated metal phthalocyanine being especially preferred, e.g., cobalt phthalocyanine monosulfate, cobalt phthalocyanine disulfonate, etc. The sulfonated derivatives may be prepared, for example, by reacting cobalt, vanadium or other methal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

A second necessary component of the catalytic composite of this invention is an onium compound dispersed on the adsorptive support. As described above, onium compounds are ionic compounds in which the positively charged (cationic) atom is a nonmetallic element other than carbon not bonded to hydrogen. The onium compounds which can be used in this invention are selected from the group consisting of phosphonium, arsonium, stibonium, oxonium and sulfonium compounds, i.e., the cationic atom is phosphorus, arsenic, antimony, oxygen and sulfur, respectively. Table 1 presents the general formula of these onium compounds, and the cationic element.

TABLE 1

| Name and Formula of Onium Compounds | | |
|---|---|---|
| Formula* | Name | Cationic Element |
| $R_4N^+$ | quaternary ammonium | nitrogen |
| $R_4P^+$ | phosphonium | phosphorous |
| $R_4As^+$ | arsonium | arsenic |
| $R_4Sb^+$ | stibonium | antimony |
| $R_3O^+$ | oxonium | oxygen |
| $R_3S^+$ | sulfonium | sulfur |

*R is a hydrocarbon radical.

For the practice of this invention it is desirable that the onium compounds have the general formula $[R'(R)_yM]^+X^-$. In said formula, R is a hydrocarbon radical containing up to about 20 carbon atoms and selected from the group consisting of alkyl, cycloalkyl, aryl, alkaryl and aralkyl. It is preferred that one R radical be an alkyl containing from about 10 to about 18 carbon atoms. The other R radical(s) is (are) preferably methyl, ethyl, propyl, butyl, benzyl, phenyl and naphthyl radicals. R' is a straight chain alkyl radical containing from about 5 to about 20 carbon atoms and preferably an alkyl radical containing about 10 to about 18 carbon atoms. X is hydroxide or a halide selected from the group consisting of chlorine, bromine and iodine with chlorine and hydroxide preferred. Further, y is 2 when M is oxygen or sulfur and y is 3 when M is phosphorous, arsenic or antimony. The preferred cationic elements are phosphorous, sulfur and oxygen.

Illustrative examples of onium compounds which can be used to practice this invention, but which are not intended to limit the scope of this invention are: benzyldimethylhexadecylphosphonium chloride, benzyldiethyldodecylphosphonium chloride, phenyldimethyldecylphosphonium chloride, trimethyldodecylphosphonium chloride, naphthyldipropylhexadecyl phosphonium chloride, benzyldibutyldecylphosphonium chloride, benzyldimethylhexadecylphosphonium hydroxide, trimethyldodecylphosphonium hydroxide naphthyldimethylhexadecylphosphonium hydroxide, tributylhexadecylphosphonium chloride, benzylmethylhexadecyloxonium chloride, benzylethyldodecyloxonium chloride, naphthylpropyldecyloxonium hydroxide, dibutyldodecyloxonium chloride, phenylmethyldodecyloxonium chloride, phenylmethyldodecyloxonium chloride, dipropylhexadecyloxonium chloride, dibutylhexadecyloxonium hydroxide, benzylmethylhexadecylsulfonium chloride, diethyldodecylsulfonium chloride, naphthylpropylhexadecylsulfonium hydroxide, benzylbutyldodecylsulfonium chloride, phenylmethylhexadecylsulfonium chloride, dimethylhexadecylsulfonium chloride, benzylbutyldodecylsulfonium hydroxide, benzyldiethyldodecylarsonium chloride, benzyldiethyldodecylstibonium chloride, trimethyldodecylarsonium chloride, trimethyldodecylstibonium chloride, benzyldibutyldecylarsonium chloride, benzyldibutyldecylstibonium chloride, tributylhexadecylarsonium chloride, tributylhexadecylstibonium chloride, naphthylpropyldecylarsonium hydroxide, naphthylpropyldecylstibonium hydroxide, benzylmethylhexadecylarsonium chloride, benzylmethylhexadecylstibonium chloride, benzylbutyldodecylarsonium hydroxide, benzylbutyldodecylstibonium hydroxide.

The catalytic composite may also optionally contain an alkali metal hydroxide, i.e., the hydroxides of the metals of Group IA of the Periodic Table. When the counter ion, i.e., X in the above formula, is hydroxide, the addition of an alkali metal hydroxide is not necessary. However, when X is a halide it is preferable, though not essential, to add an alkali metal hydroxide. When an alkali metal hydroxide component is used, it can be a single alkali metal hydroxide, or a mixture of two or more alkali metal hydroxides. The preferred alkali metal hydroxide for use in this invention is sodium hydroxide. Potassium hydroxide is also preferred. The alkali metal hydroxides are widely available commercially.

The metal chelate component, onium compound and optional alkali metal hydroxide can be dispersed on the adsorbent support in any conventional or otherwise convenient manner. The components can be dispersed on the support simultaneously from a common aqueous or alcoholic solution and/or dispersion thereof or separately and in any desired sequence. The dispersion process can be effected utilizing conventional techniques whereby the support in the form of spheres, pills, pellets, granules or other particles of uniform or irregular size or shape, is soaked, suspended, dipped one or more times, or otherwise immersed in an aqueous or alcoholic solution and/or dispersion to disperse a given quantity of the alkali metal hydroxide, onium compound and metal chelate components. Typically, the onium compound will be present in a concentration of about 0.1 to about 10 weight percent of the composite. In general, the amount of metal phthalocyanine which can be adsorbed on the solid adsorbent support and still form a stable catalytic composite is up to about 25 weight percent of the composite. A lesser amount in the range of from about 0.1 to about 10 weight percent of the composite generally forms a suitably active catalytic composite. Finally, when an alkali metal hydroxide is present, it may be present in a concentration of about 0.001 to about 8 weight percent of the composite and preferably in a concentration of at least about 0.005 weight percent of the composite.

One preferred method of preparation involves the use of a steam-jacketed rotary dryer. The adsorbent support is immersed in the impregnating solution and/or dispersion containing the desired components contained in the dryer and the support is tumbled therein by the rotating motion of the dryer. Evaporation of the solution in contact with the tumbling support is expedited by applying steam to the dryer jacket. In any case, the resulting composite is allowed to dry under ambient temperature conditions, or dried at an elevated temperature in an oven, or in a flow of hot gases, or in any other suitable manner.

An alternative and convenient method for dispersing the onium compound, metal chelate and optional alkali metal hydroxide components on the solid adsorbent support comprises predisposing the support in a sour petroleum distillate treating zone or chamber as a fixed bed and passing a metal chelate, onium compound and optional alkali metal hydroxide solution and/or dispersion through the bed in order to form the catalytic composite in situ. This method allows the solution and/or dispersion to be recycled one or more times to achieve a desired concentration of the alkali metal hydroxide, onium compound, and metal chelate components on the adsorbent support. In still another alternative method, the adsorbent may be predisposed in said treating zone or chamber, and the zone or chamber thereafter filled with the solution and/or dispersion to soak the support for a predetermined period.

Processes for sweetening a sour petroleum distillate are well known in the art. For example, see U.S. Pat. Nos. 4,033,860 and 4,337,147 which are incorporated herein by reference. Typically a sour petroleum distillate is passed in contact with a catalytic composite. The catalytic composite can be dispersed within the distillate, or it can be disposed as a fixed bed in a container. The contacting can be batch-type, or continuous. A continuous treating operation using a fixed bed of the catalytic composite is preferred. An oxidizing agent such as oxygen or air, with air being preferred, is contacted with the distillate and the catalytic composite to provide at least the stoichiometric amount of oxygen required to oxidize the mercaptan content of the distillate to disulfides.

The prior art also discloses (U.S. Pat. Nos. 4,033,860 and 4,337,147) that treatment of sour petroleum distillates in contact with a catalytic composite can be performed in the presence of an alkaline agent. The catalytic composite is initially saturated with an alkaline agent, and an alkaline agent thereafter passed in contact with the catalyst bed, continuously or intermittently as required, admixed with the sour petroleum distillate. Any suitable alkaline agent may be employed. An alkali metal hydroxide in aqueous solution, e.g., sodium hydroxide in aqueous solution, is most often employed. The solution may further contain a solubilizer to promote mercaptan solubility, e.g., alcohol, and especially methanol, ethanol, n-propanol, isopropanol, etc., and also phenols, cresols, and the like. The solubilizer, when employed, is preferably methanol, and the alkaline solution may suitably contain from about 2 to about 100 volume percent thereof. Sodium hydroxide and potassium hydroxide constitute the preferred alkaline agents. Others including lithium hydroxide, rubidium hydroxide and cesium hydroxide may also be used.

The method of treating of this invention can be effected in accordance with prior art treating conditions. The process is usually effected at ambient temperature conditions, although higher temperatures up to about 105° C. are suitably employed. Pressures of up to about 1,000 psi or more are operable although atmospheric or substantially atmospheric pressures are suitable. Contact times equivalent to a liquid hourly space velocity of from about 0.5 to about 10 or more are effective to achieve a desired reduction in the mercaptan content of a sour petroleum distillate, an optimum contact time being dependent on the size of the treating zone, the quantity of catalyst contained therein, and the character of the distillate being treated.

As previously stated, sweetening of the sour petroleum distillate is effected by oxidizing the mercaptans to disulfides. Accordingly, the process is effected in the presence of an oxidizing agent, preferably air, although oxygen or other oxygen-containing gases may be employed. In fixed bed treated operations, the sour petroleum distillate may be passed upwardly or downwardly through the catalytic composite. The sour petroleum distillate may contain sufficient entrained air, but generally added air is admixed with the distillate and charged to the treating zone concurrently therewith. In some cases, it may be advantageous to charge the air separately to the treating zone and countercurrent to the distillate separately charged thereto.

The improvement in the method of treating a sour petroleum distillate of this invention is the use of the catalytic composite of this invention in place of the catalytic composite of the prior art. Specifically, the improvement consists of using a catalytic composite comprising a metal chelate, an onium compound selected from the group consisting of phosphonium, arsonium, stibonium, oxonium and sulfonium compounds and optionally an alkali metal hydroxide, all dispersed on an adsorbent support.

As heretofore mentioned, the onium compound, metal chelate component and optional alkali metal hydroxide of the catalytic composite of this invention are readily adsorbed on the adsorbent support. Thus, any of the components which may in time be leached from the support and carried away in the reactant stream can be easily restored to the catalytic composite in situ by introducing any of the components to the sweetening process, for example, in admixture with the distillate being treated thereby depositing the components on the solid adsorbent support in the treating zone.

The following examples are presented in illustration of this invention and are not intended as undue limitations on the generally broad scope of the invention as set out in the appended claims.

EXAMPLE I

This example describes the preparation of an unpromoted catalyst. To 800 mL of methanol there was added 1.9 grams of partially sulfonated cobalt phthalocyanine. This mixture was added to 276 cc of 35–100 mesh activated charcoal support and allowed to stand until essentially all of the phthalocyanine had adsorbed onto the support. The mixture was filtered at room temperature to remove the methanol. The resulting solid was dried in air at 25° C. for 48 hours. The catalyst (designated A) consisted of about 1.5 weight percent sulfonated cobalt phthalocyanate on 35–100 mesh charcoal.

EXAMPLE II

This example describes the preparation of a catalyst containing a quaternary ammonium compound. To 900 mL of water there was added 830 cc of 35–100 mesh activated charcoal. Separately, to 5.8 g of partially sulfonated cobalt phthalocyanine there was added 33.3 g of an aqueous solution of benzyldimethyl alkylammonium chloride (~50%). The resulting mixture was dissolved in a minimum amount of $H_2O$(~10 mL) and added to the suspension of activated charcoal in $H_2O$. The resulting mixture was allowed to stand until all of the phthalocyanine had been adsorbed onto the charcoal. The mixture was filtered and the resulting solid dried at 100° C. for 10 hours in a drying oven. This catalyst (designated B) consisted of about 1.5 weight percent sulfonated cobalt phthalocyanine and about 5% quaternary ammonium compound on 35–100 mesh charcoal.

EXAMPLE III

This example describes the preparation of a catalyst according to the invention. To 125 mL of toluene there was added 0.72 g of partially sulfonated cobalt phthalocyanine and 2.79 g of tri-n-butylhexadecylphosphonium bromide. This mixture was added to 104 cc of 35–100 mesh activated charcoal and the resulting mixture was allowed to stand until all of the phthalocyanine had been adsorbed onto the charcoal. The mixture was filtered and the resulting solid was dried at 25° C. for about 12 hours. This catalyst (designated C) consists of about 1.5 weight percent sulfonated cobalt phthalocyanine and about 6.5 percent phosphonium compound on 35–100 mesh charcoal. The loadings of quaternary ammonium and phosphonium compounds on catalysts B and C, respectively, are equivalent on a molar basis.

EXAMPLE IV

A sour FCC gasoline feedstock boiling in the 120°–400° F. range and containing about 325 ppm mercaptan sulfur was processed downflow through a catalytic composite at a liquid hourly space velocity of about 25. The catalytic composite was present as a fixed bed in a tubular reactor. The feedstock was charged under sufficient air pressure to provide about twice the stoichiometric amount of oxygen required to oxidize the mercaptans. Samples were periodically removed and analyzed for mercaptan sulfur.

Catalysts A, B and C were each separately tested as described above. The results from those tests are presented in FIG. 1. FIG. 1 presents plots of mercaptan sulfur versus time on stream for Catalysts A, B and C. These plots clearly show that a catalytic composite containing a phosphonium compound has improved stability over a catalytic composite containing an ammonium quaternary salt. Both catalysts show an improvement over a catalytic composite without any promoter.

What is claimed is:

1. In a method for treating a sour petroleum distillate containing mercaptans comprising contacting the distillate in the presence of an oxidizing agent with a catalytic composite effective in oxidizing said mercaptans to disulfides, wherein the improvement comprises a catalytic composite comprising a metal chelate and an onium compound selected from the group consisting of phosphonium, arsonium, stibonium, oxonium and sulfonium compounds dispersed on an adsorbent support, the onium compound having the formula $[R'(R)_yM]^+X^-$ wherein R is a hydrocarbon radical containing up to about 20 carbon atoms and selected from the group consisting of alkyl, cycloalkyl, aryl, alkaryl and aralkyl, R' is a straight chain alkyl radical containing from about 5 to about 20 carbon atoms, M is phosphorous, arsenic, antimony, oxygen or sulfur, X is hydroxide or a halide selected from the group consisting of chlorine, bromine and iodine, y is 2 when M is oxygen or sulfur and y is 3 when M is phosphorous, arsenic or antimony.

2. The method of claim 1 where the onium compound is present in a concentration of about 0.1 to about 10 weight percent of the catalytic composite.

3. The method of claim 1 where the onium compound is a phosphonium compound.

4. The method of claim 3 where the phosphonium compound is tri-n-butylhexadecylphosphonium bromide.

5. The method of claim 1 where the onium compound is an oxonium compound.

6. The method of claim 1 where the onium compound is a sulfonium compound.

7. The method of claim 1 where said adsorptive support is an activated charcoal.

8. The method of claim 1 where said metal chelate is a metal phthalocyanine.

9. The method of claim 8 where said metal phthalocyanine is cobalt phthalocyanine.

10. The method of claim 8 where said metal phthalocyanine is cobalt phthalocyanine monosulfonate.

11. The method of claim 8 where said metal phthalocyanine is vanadium phthalocyanine.

12. The method of claim 1 further characterized in that the catalytic composite also has dispersed on the adsorbent support an alkali metal hydroxide.

13. The method of claim 12 where said alkali metal hydroxide is present in a concentration of about 0.001 to about 8 weight percent of said catalytic composite.

14. The method of claim 12 where said alkali metal hydroxide is sodium hydroxide.

15. The method of claim 12 where said alkali metal hydroxide is potassium hydroxide.

* * * * *